May 5, 1936. C. A. WULF 2,040,038
WELDING METHOD AND APPARATUS
Filed Oct. 20, 1930 2 Sheets-Sheet 1
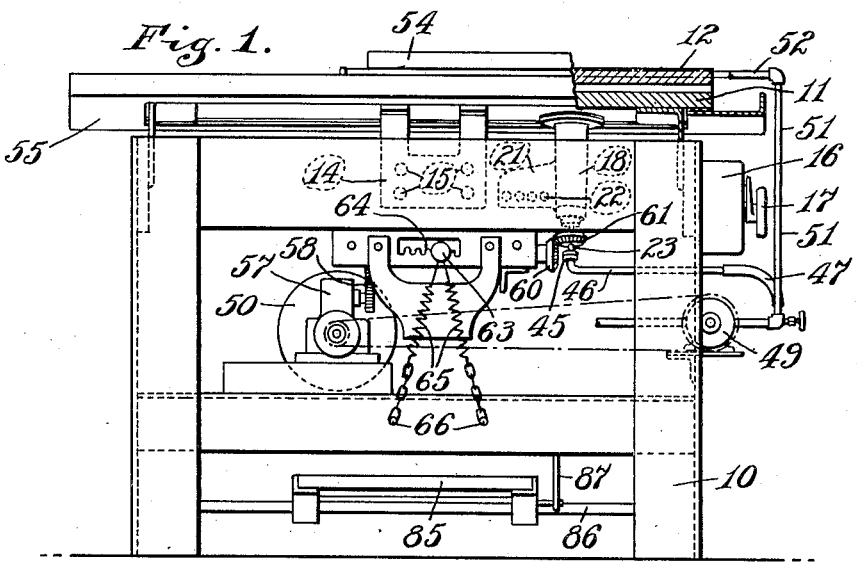
INVENTOR.
Charles A. Wulf,
BY
Hood + Hahn.
ATTORNEYS May 5, 1936. C. A. WULF 2,040,038
WELDING METHOD AND APPARATUS
Filed Oct. 20, 1930  2 Sheets-Sheet 2
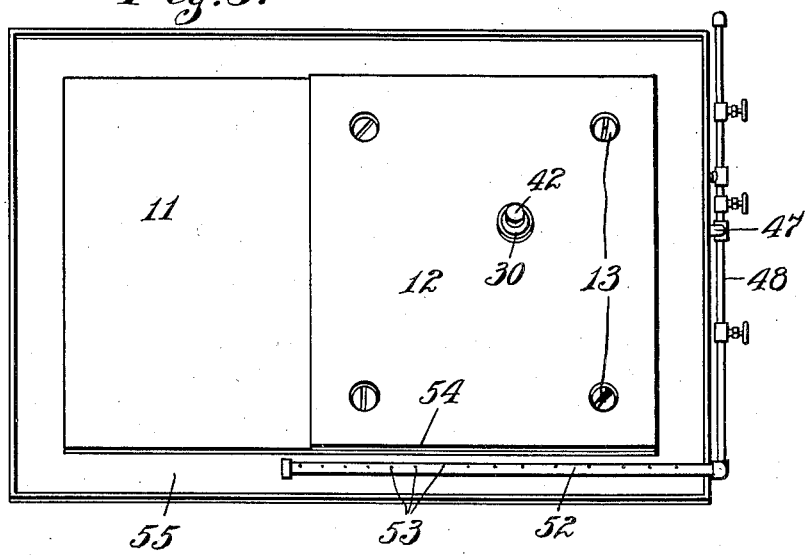
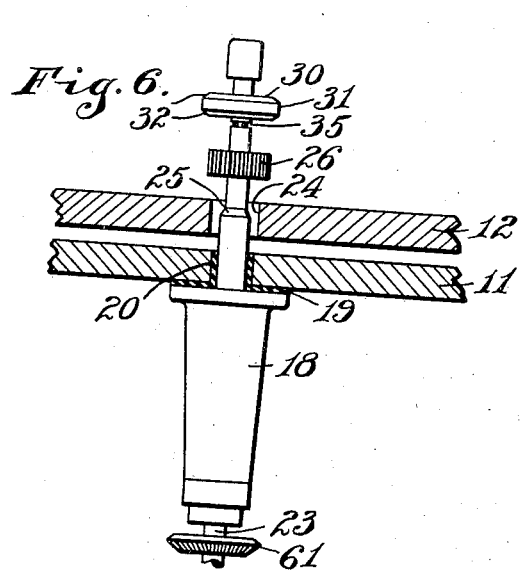 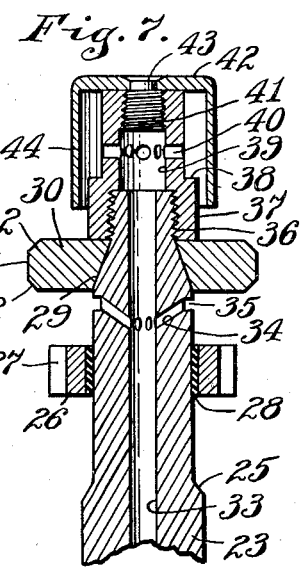
INVENTOR.
Charles A. Wulf,
BY
Hood + Hahn.
ATTORNEYS

UNITED STATES PATENT OFFICE 2,040,038

WELDING METHOD AND APPARATUS

Charles A. Wulf, Indianapolis, Ind., assignor to American Valve & Enameling Corporation, Indianapolis, Ind., a corporation of Indiana Application October 20, 1930, Serial No. 489,878

8 Claims. (Cl. 219—10)

The present application relates to a welding method and apparatus, and the primary object of the invention is to provide a method of, and an apparatus for, welding sheet metal elbows or tubing. The metal to be welded is quite thin, and consequently is quite liable to distortion as a result of the welding heat. Furthermore, difficulties in welding articles of this type have previously been encountered because of the curved shape thereof, and the difficulty of moving the work at a substantially uniform lineal speed past the electrode, or vice versa. Among the objects of the invention then, are to simplify and facilitate the operations involved in welding such articles, and to provide a simple and efficient mechanism for carrying out such operations.

In the accompanying drawings forming a part of the present application,

Fig. 1 is a front elevation of a machine constructed in accordance with the present invention;

Fig. 2 is an end elevation thereof, looking from the right of Fig. 1; a portion of the machine being shown in section;

Fig. 3 is a top plan view of the machine;

Fig. 4 is a top plan view of the carriage forming an element of the mechanism;

Fig. 5 is a side elevation thereof;

Fig. 6 is an elevational view, on an enlarged scale, of the tube electrode, parts of the bed and plate electrode being shown in section; and Fig. 7 is a central transverse section through the upper portion of the tube electrode and its associated elements.

Referring more particularly to the drawings, it will be seen that the machine comprises a frame 10 upon which is mounted a bed plate 11 insulated from said frame and preferably carrying an electrode plate 12. As will be obvious as the description proceeds, the electrode plate 12 does not form an essential element of the mechanism, but is mounted upon the base plate 11 simply to permit removal thereof from the machine without necessitating disconnection of the various electrical leads. In the appended claims, the term "electrode plate" is intended to apply to any plate connected to the source of current, whether or not that plate is supported upon a separate bed plate.

As is shown clearly in Figs. 2 and 3, the electrode plate 12 is secured to the bed plate 11 through the medium screws 13, or other suitable fastenings. To the under surface of the bed plate 11 there is secured a bus plate 14 provided with a plurality of apertures 15 to which may be connected leads (not shown) from the rheostat 16, said rheostat being provided with an operating knob 17.

A sleeve 18 is also connected to the under surface of the bed plate 11, but is insulated therefrom by an insulating gasket 19 having a collar extending into an aperture 20 formed in the base plate 11. Said sleeve 18 is provided with a bus plate 21 formed with a plurality of apertures 22 for the reception of electrical leads, it being understood that the bus plates 14 and 21 are intended to be connected respectively to the opposite sides of a suitable source of electrical energy.

A shaft 23 is supported in the sleeve 18 in electrical contact therewith and extends upwardly through the aperture 20 in the bed plate 11 and through an aperture 24 in the electrode plate 12; said shaft being insulated from the plate 11 by the collar of the gasket 19, and being suitably insulated from the electrode plate 12.

Adjacent its upper end, the shaft 23 is formed with a tapered upwardly facing shoulder 25, and somewhat above said shoulder 25 there is mounted on said shaft a pinion 26 having teeth 27, said pinion being mounted to rotate with said shaft 23 but being insulated therefrom by a collar 28. At a point above the pinion 26, said shaft is formed with a further tapered upwardly facing shoulder 29 upon which is mounted, an electrode disc 30 having a correspondingly shaped bore. This tapered fit provides a better electrical contact than would be provided by a cylindrical fit, while leaving the disc 30 relatively free to turn with respect to the shaft 23. Said disc 30 is formed with a substantially truly cylindrical peripheral surface 31, and its edges are bevelled, as at 32.

As is clearly illustrated in Fig. 7, the shaft 23 is formed with a longitudinal bore 33 and, at a point between the pinion 26 and the disc 30, said shaft is formed with a plurality of upwardly inclined passages 34 leading from said bore 33 to an annular groove 35 formed in the periphery of said shaft.

The terminal portion of said shaft 23 above the upper surface of disc 30 is threaded as at 36 for the reception of an internally threaded extension piece 37, said extension piece being formed with an upwardly facing external shoulder 38 and with a bore 39 registering with the bore 33 of the shaft 23. Said extension piece is formed with a plurality of peripherally arranged radial passages 40 leading from said bore 39 to the exterior of said extension piece, and the upper portion of the bore 39 is internally threaded as at 41 for the reception of a screw 43 carried by a cap 42. Said cap is provided with a depending annular skirt 44, said skirt projecting to a plane below the shoulder 38.

The lower end of the shaft 23 is connected through a suitable swivel joint 45 with a pipe 46 which, in turn, is connected by a piece of hose 47 with a pipe 48 leading from the outlet port of a pump 49 suitably driven by a motor 50. Said pump 49 is supplied with water, or any other suitable cooling liquid, through a supply pipe 91 leading to a suitable source of liquid supply.

As is clearly shown in Figs. 1 and 2, the bed plate 11 and electrode 12 are inclined from the horizontal. A pipe 51 is connected to the pipe 48 and to a header 52 provided with a plurality of spray outlets 53, said header being disposed adjacent the upper edge 54 of the plate 12, whereby a sheet of water, or other liquid, may be directed upon the upper portion of said plate to flow down said plate and into a trough 55 surrounding the bed plate 11. Suitable drainage connections (not shown) are provided for the trough 55, and said trough is insulated from the plate 11 by a suitable gasket 56.

The motor 50 also drives a suitable reduction gearing 57 having an output pinion 58 meshing with the drive pinion of a change-speed transmission assembly 59. The output from said transmission assembly is through a bevelled pinion 60 meshing with a bevelled pinion 61 carried on the shaft 23. The shift lever 62 of the transmission assembly 59 projects outwardly beyond the front face of the frame 10 and terminates in a knob 63, said lever cooperating with a notched plate 64. A pair of springs 65 anchored at 66 to a member of the frame 10 tend to retain the lever 62 in adjusted position.

The work carriage forming a part of the present mechanism is shown in detail in Figs. 4 and 5 and is indicated generally at 67. Said carriage comprises a metallic base plate 68 corresponding in shape to the shape of the work to be welded and carrying, adjacent its opposite ends, sockets 69 for the reception of the work. Said carriage is formed on its opposite lateral edges with series of rack teeth 70 and 71 for cooperation with the teeth 27 of the pinion 26. At each end of the carriage 67 there is mounted a clamping assembly and, since these clamping assemblies are identical, only one will be described. Each clamping assembly comprises an upstanding post 72 carrying at its upper end a pivot pin 73 on which is mounted a lever having one arm 74 extending over the adjacent socket 69 and terminating in a foot 75. Said lever also comprises an oppositely extending arm 76. At a point below its upper end, the post 72 carries a lateral projection 77 to which, through the medium of a pin 78, there is pivoted a cam lever comprising a handle section 79 and a cam finger 80 for cooperation with the arm 76.

In use, an assembled and spot welded elbow comprising sections 81 and 82, spot welded at their ends as at 83, is laid on the carriage, the section 81 being received in the two sockets 69. The handle sections 79 are then depressed to force the feet 75 of the arms 74 down against the section 82, said handle sections being depressed sufficiently to throw the cam fingers 80 past their dead center positions. In this manner, the edges of the elbow sections 81 and 82 are forced into contact with each other to form a relatively tight joint as at 84.

Suitably disposed for actuation by the operator's foot is a treadle 85 pivoted upon a rod 86 carried by the frame 10. A link 87 is pivoted at its one end to said treadle, and at its opposite end said link is pivoted as at 88 to the free end of the actuating arm 89 of a snap switch 90, it being understood that the switch 90 is of such character as to open automatically upon the release of pressure from the treadle 85. The snap switch 90 is connected in the circuit to the electrode plate 12 and the electrode tube 23, so that current can flow through said electrodes only when said switch is in closed position.

In use, a partially completed elbow is positioned on the carriage 67 in the above described manner. The motor 50 is energized to drive the pump 49 which forces water to flow through the header 52 and upwardly through the bore 33 of the electrode 23. The water flowing through said bore is discharged through the passages 34 to flow across the under surface of the disc 30 and to be discharged outwardly in a disc shaped curtain, as a result of its contact with said surface. Water also is discharged through the passages 40 against the inner surface of the skirt 44 and, by reason of the relation of said skirt to the shoulder 38, this water is discharged downwardly in an annular curtain against the upper surface of the disc 30, and thence outwardly and across the surface 31 of said disc. The pinion 60 is driven through the transmission assembly 59 and, through the gear 61, the shaft 23 is rotated, carrying with it the pinion 26 and the electrode disc 30. The carriage 67 is now moved across the electrode plate 12 until an end of the rack 70 engages the teeth 27 of the pinion 26. The carriage is so proportioned that, when the teeth are so engaged, the abutting edges 84 of the elbow sections 81 and 82 are in registry with the surface 31 of the disc 30.

The engagement of the teeth 70 with the teeth 27 causes the carriage to be moved across the plate 12. As the carriage is so moved, the spot weld 83 at the end of the elbow comes into contact with the surface 31 of the disc 30. The carriage continues to be moved by the rotation of the pinion 26 and, just as the spot weld 83 leaves its contact with disc 30, the operator depresses the treadle 85, closing the switch 90 with a snap action, and thus closing a welding circuit through the elbow joint. It will be perfectly obvious that the elbow will be moved past the electrode disc 30 at an absolutely uniform lineal speed, except that, as the curved portion of the carriage 67 is moved past the shaft 23, the lineal speed of the work will vary slightly, due to the difference in radius between the racks 70 and 71 and the work.

The cooling liquid being discharged through the passages 34 and 40 floods the electrode 30 and floods also that portion of the elbow which is in contact with said electrode and the portions immediately adjacent such contacting portion. The cooling effect of this liquid, it has been found, absolutely prevents the distortion which has caused difficulty in the past in operations such as the one under consideration.

As the carriage continues to move past the electrode 30, the spot weld 83 at the opposite end of the joint 84 approaches the electrode 30, and just as said spot weld comes into contact with the electrode, the operator releases the treadle 85, thus breaking the welding circuit and preventing any possibility of deleterious arcing.

The operator then reverses the position of the carriage and, in the same manner, welds the joint 84 at the opposite side of the elbow.

In any welding operation of this type, tiny pieces of metal break loose from the work and fall upon the electrode plate. Obviously, the smooth and relatively soft surface of the plate 12 would be seriously damaged by such pieces in case such pieces should get between the carriage 67 and the plate 12. The sheet of water discharged by the header 53 and flowing down the surface of the plate 12 carries off with it into the trough 55 particles of this character which fall onto the plate 12.

I claim as my invention:

1. The method of welding mating elements which includes the steps of bringing a pair of such elements into mating relation, spot-welding said elements together at their ends, establishing electrical contact between said elements and one electrode of an open circuit, moving said elements, while maintaining said contact, to bring an end of the joint between said elements into contact with the other electrode of said circuit, moving said elements with respect to said last-named electrode, while maintaining both such contacts, and closing said circuit as the spot weld at the end of said joint moves out of contact with said last-mentioned electrode.

2. The method of welding mating elements which includes the steps of bringing a pair of such elements into mating relation, spot-welding said elements together at their ends, establishing electrical contact between said elements and one electrode of an open circuit, moving said elements, while maintaining said contact, to bring an end of the joint between said elements into contact with the other electrode of said circuit, driving said elements with respect to said last-named electrode at a constant lineal welding speed, while maintaining both such contacts, directing a stream of cooling liquid over said last-named electrode and the portions of said elements contacted thereby, and closing said circuit as the spot weld at the end of said joint moves out of contact with said last-mentioned electrode, while maintaining the flow of such liquid.

3. The method of welding mating elements which includes the steps of bringing a pair of such elements into mating relation, spot-welding said elements together at their ends, establishing electrical contact between said elements and one electrode of an open circuit, moving said elements, while maintaining said contact, to bring an end of the joint between said elements into contact with the other electrode of said circuit, moving said elements longitudinally past said last-named electrode, while maintaining both such contacts, closing said circuit at the moment when the spot weld at the first end of said joint leaves contact with said last-named electrode, and reopening said circuit at the moment when the spot weld at the opposite end of said joint comes into contact with said last-named electrode.

4. The method of welding mating elements which includes the steps of bringing a pair of such elements into mating relation, spot-welding said elements together at their ends, establishing electrical contact between said elements and one electrode of an open circuit, moving said elements, while maintaining said contact, to bring an end of the joint between said elements into contact with the other electrode of said circuit, driving said elements at a constant lineal welding speed longitudinally past said last-named electrode, while maintaining both such contacts, closing said circuit at the moment when the spot weld at the first end of said joint leaves contact with said last-named electrode, reopening said circuit at the moment when the spot weld at the opposite end of said joint comes into contact with said last-named electrode, and constantly maintaining a flow of cooling liquid over said last-named electrode and over portions of said elements in contact therewith.

5. Welding apparatus comprising, in combination, a frame, a bed plate mounted on said frame and insulated therefrom, means connecting said bed plate to one side of a source of electrical energy, an electrode plate mounted on and secured to said bed plate, a rotatable tube associated with said plates and insulated therefrom, an electrode wheel mounted on said tube, means connecting said tube to the other side of said source of energy, and means for supplying a flow of cooling liquid to said tube, said tube being formed with ports for directing said flow over said electrode wheel.

6. Welding apparatus comprising a plate electrode connected to one side of a source of electrical energy, a tube connected to the other side of said source and projecting upwardly through said plate and insulated therefrom, contact means on said tube, and means for supplying a flow of cooling liquid to said tube, said tube being formed with ports directing said flow over the exterior surface of said contact means.

7. Welding apparatus comprising a plate electrode connected to one side of a source of electrical energy, a tube projecting upwardly through said plate and insulated therefrom, said tube being connected to the other side of said source, liquid supply means connected to the lower end of said tube, a contact disc mounted on said tube adjacent the upper end thereof, said tube being formed with a lateral upwardly-inclined port located below said disc for directing a stream of liquid against the under surface of said disc, said tube further being formed with a plurality of ports above said disc, and means for causing the liquid discharged from said last-named ports to flow downwardly toward said disc in a substantially cylindrical sheet.

8. Welding apparatus comprising a plate electrode connected to one side of a source of electrical energy, a tube projecting upwardly through said plate and insulated therefrom, said tube being connected to the other side of said source, liquid supply means connected to the lower end of said tube, a contact disc mounted on said tube adjacent the upper end thereof, said tube being formed with a lateral upwardly-inclined port located below said disc for directing a stream of liquid against the under surface of said disc, said tube further being formed with a plurality of ports above said disc, and a cap on the upper end of said tube and formed with a depending annular skirt, said skirt extending to a point below said last-named ports.

CHARLES A. WULF.